US007206966B2

(12) United States Patent
Barr et al.

(10) Patent No.: US 7,206,966 B2
(45) Date of Patent: Apr. 17, 2007

(54) FAULT-TOLERANT MULTI-CORE MICROPROCESSING

(75) Inventors: Andrew Harvey Barr, Roseville, CA (US); Ken Gary Pomaranski, Roseville, CA (US); Dale John Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 617 days.

(21) Appl. No.: 10/690,727

(22) Filed: Oct. 22, 2003

(65) Prior Publication Data

US 2005/0102565 A1 May 12, 2005

(51) Int. Cl.
*G06F 11/00* (2006.01)

(52) U.S. Cl. .......................................... 714/25; 714/30

(58) Field of Classification Search .................. 714/25, 714/30

See application file for complete search history.

(56) References Cited

U.S. PATENT DOCUMENTS

| | | | | |
|---|---|---|---|---|
| 5,202,975 | A * | 4/1993 | Rasbold et al. | 717/151 |
| 5,412,671 | A * | 5/1995 | Tsuchiya | 714/805 |
| 5,819,088 | A | 10/1998 | Reinders | |
| 5,835,776 | A * | 11/1998 | Tirumalai et al. | 717/161 |
| 6,134,675 | A * | 10/2000 | Raina | 714/37 |
| 6,360,333 | B1 * | 3/2002 | Jansen et al. | 714/25 |
| 6,367,032 | B1 * | 4/2002 | Kasahara | 714/25 |
| 6,408,377 | B2 * | 6/2002 | Munson | 712/215 |
| 6,434,712 | B1 * | 8/2002 | Urban et al. | 714/12 |
| 6,550,020 | B1 * | 4/2003 | Floyd et al. | 714/10 |
| 6,553,530 | B1 * | 4/2003 | Kim | 714/738 |
| 6,625,749 | B1 * | 9/2003 | Quach | 714/10 |
| 6,640,313 | B1 * | 10/2003 | Quach | 714/10 |
| 6,857,083 | B2 * | 2/2005 | Floyd et al. | 714/30 |
| 6,907,548 | B2 * | 6/2005 | Abdo | 714/43 |
| 6,983,398 | B2 * | 1/2006 | Prabhu | 714/12 |
| 7,065,681 | B2 * | 6/2006 | Quach | 714/52 |
| 2003/0005380 | A1 * | 1/2003 | Nguyen et al. | 714/736 |
| 2003/0191996 | A1 * | 10/2003 | Mukherjee et al. | 714/724 |

FOREIGN PATENT DOCUMENTS

| | | | |
|---|---|---|---|
| JP | 59055549 | A | 3/1984 |
| JP | 60173654 | A | 9/1985 |
| JP | 61101844 | A | 5/1986 |
| JP | 63255743 | A | 10/1988 |
| JP | 01021564 | A | 1/1989 |
| JP | 05210529 | A | 8/1993 |

OTHER PUBLICATIONS

Patents Act 1977: Search Report under Section 17 for Application No. GB 0422724.5.

* cited by examiner

*Primary Examiner*—Scott Baderman
*Assistant Examiner*—Brian Assessor

(57) ABSTRACT

One embodiment disclosed relates to a method of executing program code on a target microprocessor with multiple CPU cores thereon. One of the CPU cores is selected for testing, and inter-core context switching is performed. Parallel execution occurs of diagnostic code on the selected CPU core and the program code on remaining CPU cores. Another embodiment disclosed relates to a microprocessor having a plurality of CPU cores integrated on the microprocessor chip. Inter-core communications circuitry is coupled to each of the CPU cores and configured to perform context switching between the CPU cores.

14 Claims, 9 Drawing Sheets

140

100

FAULT-TOLERANT MULTI-CORE MICROPROCESSING

BACKGROUND OF THE INVENTION

1. Field of the Invention

The present invention relates generally to computer systems. More particularly, the present invention relates to fault-tolerant computer systems.

2. Description of the Background Art

Previous solutions for providing fault tolerance in digital processing systems include hardware-based solutions, software-based solutions, or some combination of both.

The hardware schemes require much extra system hardware. The redundant system hardware may be operated, for example in lock-step or utilizing complex voting schemes. The software schemes may be performed either by executing the program multiple times on the same computer or in parallel on multiple computer systems.

Typically, the program is re-run at least three times, resulting in effective execution times that are three times greater than they are without the software verification. As such, the software fault-tolerant solution disadvantageously requires a longer run-time or requires multiple computer systems.

Combination schemes require extra hardware, at least two times, and typically utilize software check-pointing. Software check-pointing involves, upon an error, the capability to re-run a specific instruction sequence.

All the above-discussed solutions are expensive in terms of cost and/or system performance. Hence, improvements in systems and methods for providing fault tolerant digital processing are highly desirable.

SUMMARY

One embodiment of the invention pertains to a method of executing program code on a target microprocessor chip with multiple CPU cores thereon. One of the CPU cores is selected for testing, and inter-core context switching is performed. Parallel execution occurs of diagnostic code on the selected CPU core and the program code on remaining CPU cores.

Another embodiment of the invention relates to a microprocessor having a plurality of CPU cores integrated on the microprocessor chip. Inter-core communications circuitry is coupled to each of the CPU cores and configured to perform context switching between the CPU cores.

DETAILED DESCRIPTION

As discussed above, prior systems and methods for fault-tolerant digital processing have various disadvantages. The present invention relates to systems and methods for improving the reliability of digital processing.

Figure 1:
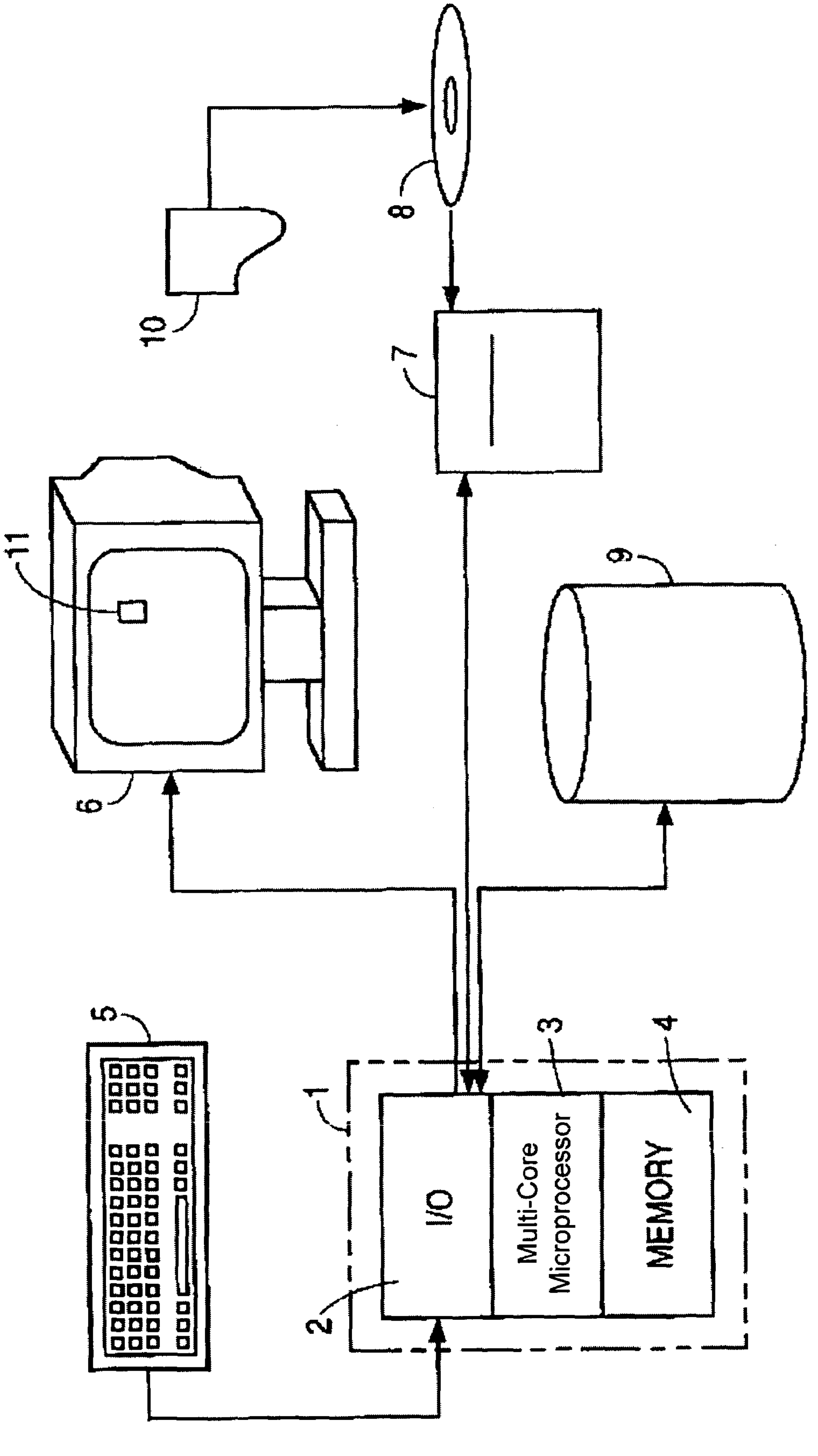
FIG. 1 illustrates a portion of a computer, including a CPU and conventional memory in which the presentation may be embodied.

The environment in which the present invention is used encompasses a general-purpose computer system. Some of the elements of a typical general-purpose computer are shown in FIG. 1, wherein a computing system 1 is shown, having an Input/output ("I/O") section 2, a microprocessor 3, and a memory section 4. The I/O section 2 is connected to a keyboard and/or other input devices 5, a display unit and/or other output devices 6, one or more fixed storage units 9 and/or removable storage units 7. The removable storage unit 7 can read a data storage medium 8 which typically contains programs 10 and other data. In accordance with an embodiment of the invention, the microprocessor 3 comprises a multi-core microprocessor. In other words, the microprocessor 3 comprises multiple CPU cores.

Figure 2:
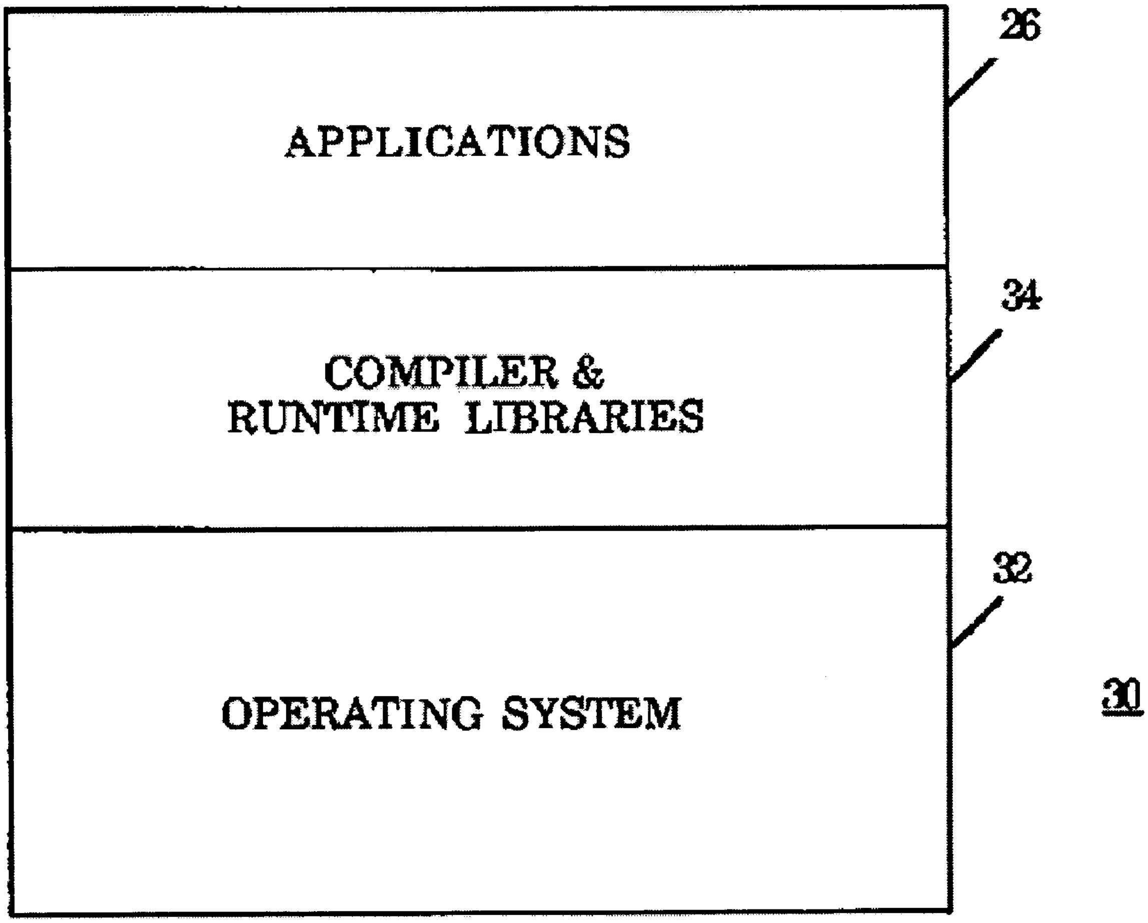
FIG. 2 illustrates example software elements of the illustrative computer system of FIG. 1.

FIG. 2 illustrates example software elements of the illustrative computer system of FIG. 1. Shown are application programs 26. Such applications 26 may be compiled using a compiler 34 incorporated with the teachings of the present invention. The compiled application programs 26 access the runtime libraries 34 for services during execution, which in turn access the operating system 32 for system services. The compiler 34 also accesses the operating system 32 for system services during compilation of application programs 26.

A compiler 34 incorporating the teachings of the present invention may comprise either a native compiler running on the target microprocessor system, or a cross compiler running on a different microprocessor system. In accordance with an embodiment of the invention, the target microprocessor for the compiler has multiple functional units of the same type. For example, the microprocessor may comprise one with a superscalar architecture.

Figure 3A:
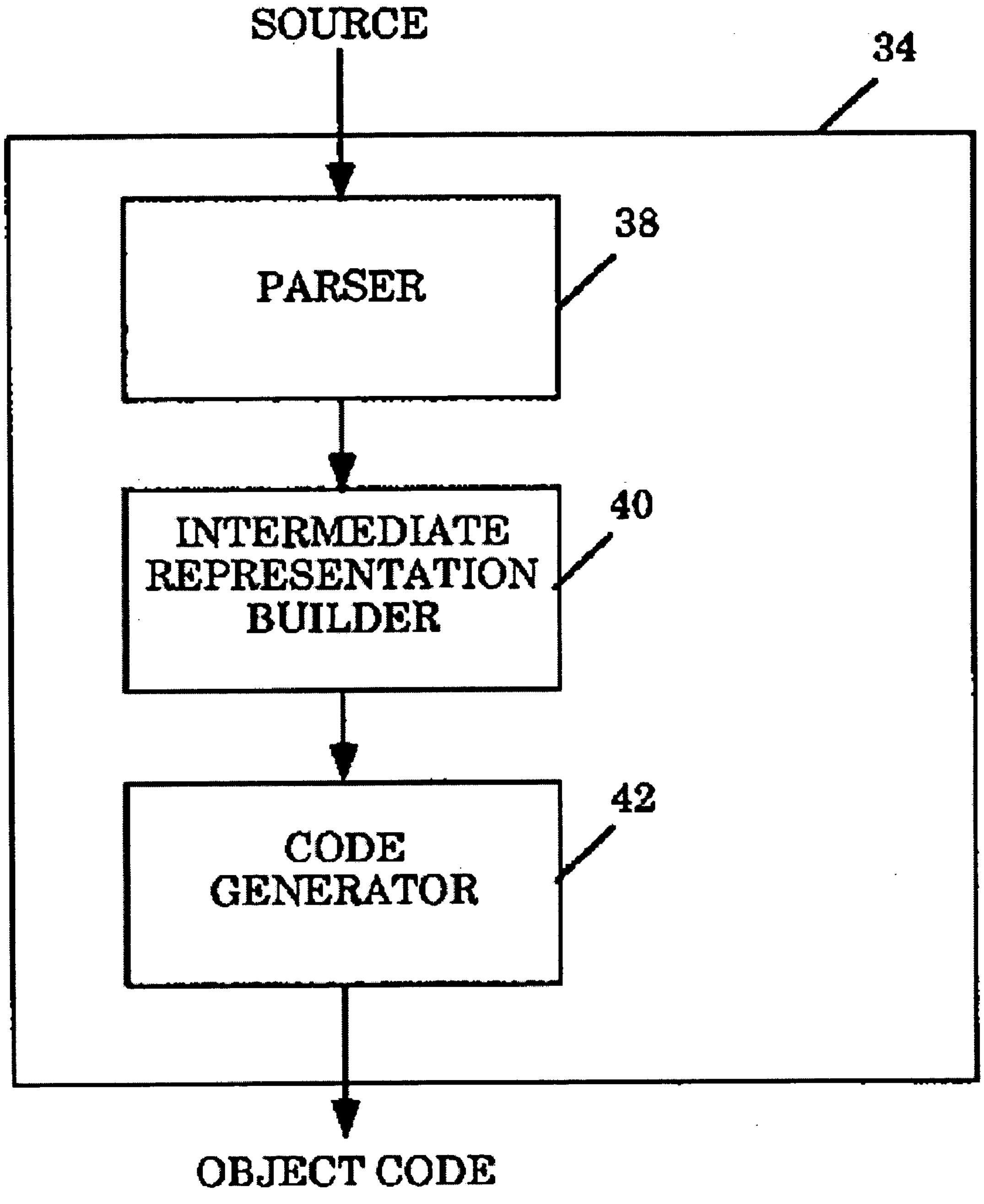
FIG. 3*a* is a block diagram illustrating components of a compiler in one example.
Figure 3B:
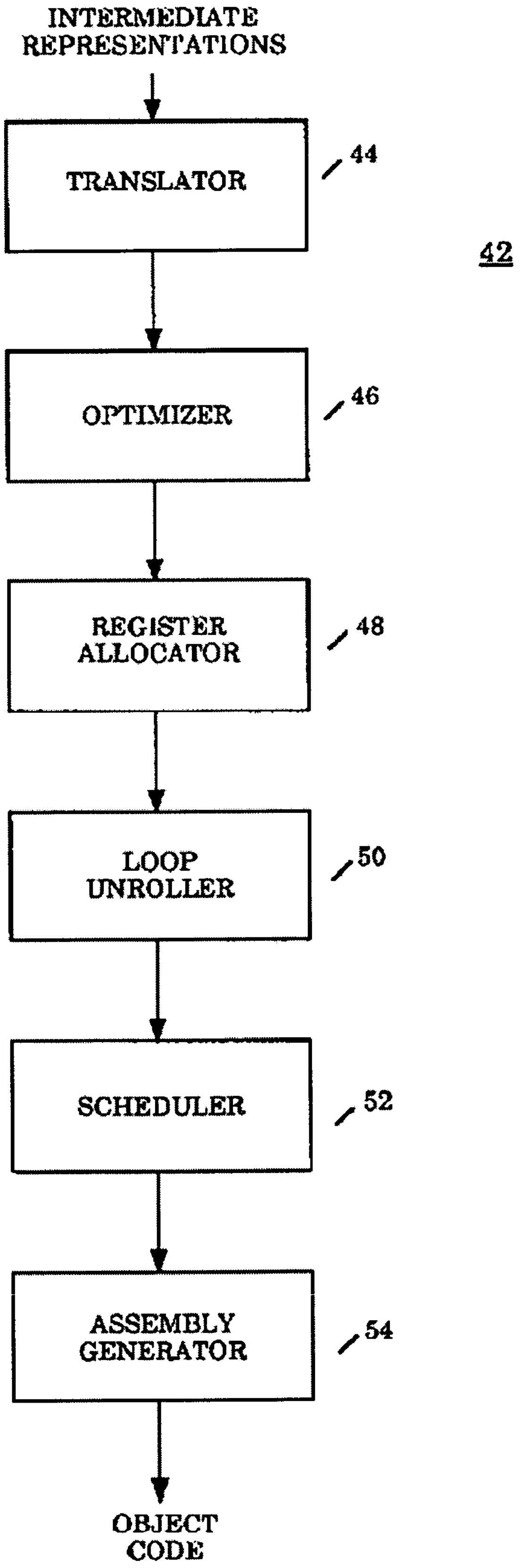
FIG. 3*b* is a block diagram illustrating components of a code generator in one example.

Referring now to FIGS. 3*a* and 3*b*, these block diagrams illustrate one example of a compiler. As illustrated in FIG. 3*a*, in this example, the compiler 34 comprises a parser 38, an intermediate representation builder 40, and a code generator 42 incorporated with the teachings of the present invention. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. The compiler 34 may be configured differently in accordance with other embodiments.

As illustrated in FIG. 3*b*, an example code generator 42 may be configured to include a translator 44, an optimizer 46, a register allocator 48, a loop unroller 50, a scheduler 52, and an assembly code generator 54. The translator 44 receives the intermediate representations as inputs. In response, the translator 44 builds the loop table, orders instruction blocks, constructs data flow graphs etc. The optimizer 46 receives the intermediate representations and associated information as inputs, including the loop table and the data flow graph. In response, it performs various optimizations. The register allocator 48 receives the optimized intermediate representations and associated information as inputs. In response, it allocates registers of the target microprocessor to the instructions being generated. The loop unroller 50 receives the optimized intermediate representations with allocated registers and associated information as inputs. In response, it restructures the instructions being generated, unrolling loops in the instructions being generated for an optimal amount of time consistent with the resources available in the target microprocessor. The scheduler 52 receives the restructured intermediate representations and associated information as inputs. In response, it further restructures the instructions to be generated for parallelism. Lastly, the assembly code generator 54 receives the optimized, register allocated, and restructured intermediate representations and associated information as inputs. In response, it generates the object code for the program being compiled. The code generator 42 may be configured differently in accordance with other embodiments.

While for ease of understanding, the code generator 42 is being described with the above described embodiment which allocates registers before unrolling the loops in the instructions being generated and scheduling instructions for parallelism, based on the descriptions to follow, it will be appreciated that the present invention may be practiced with other register allocation, loop unrolling and scheduling approaches having different register allocation, loop unrolling and scheduling order.

Figure 4:
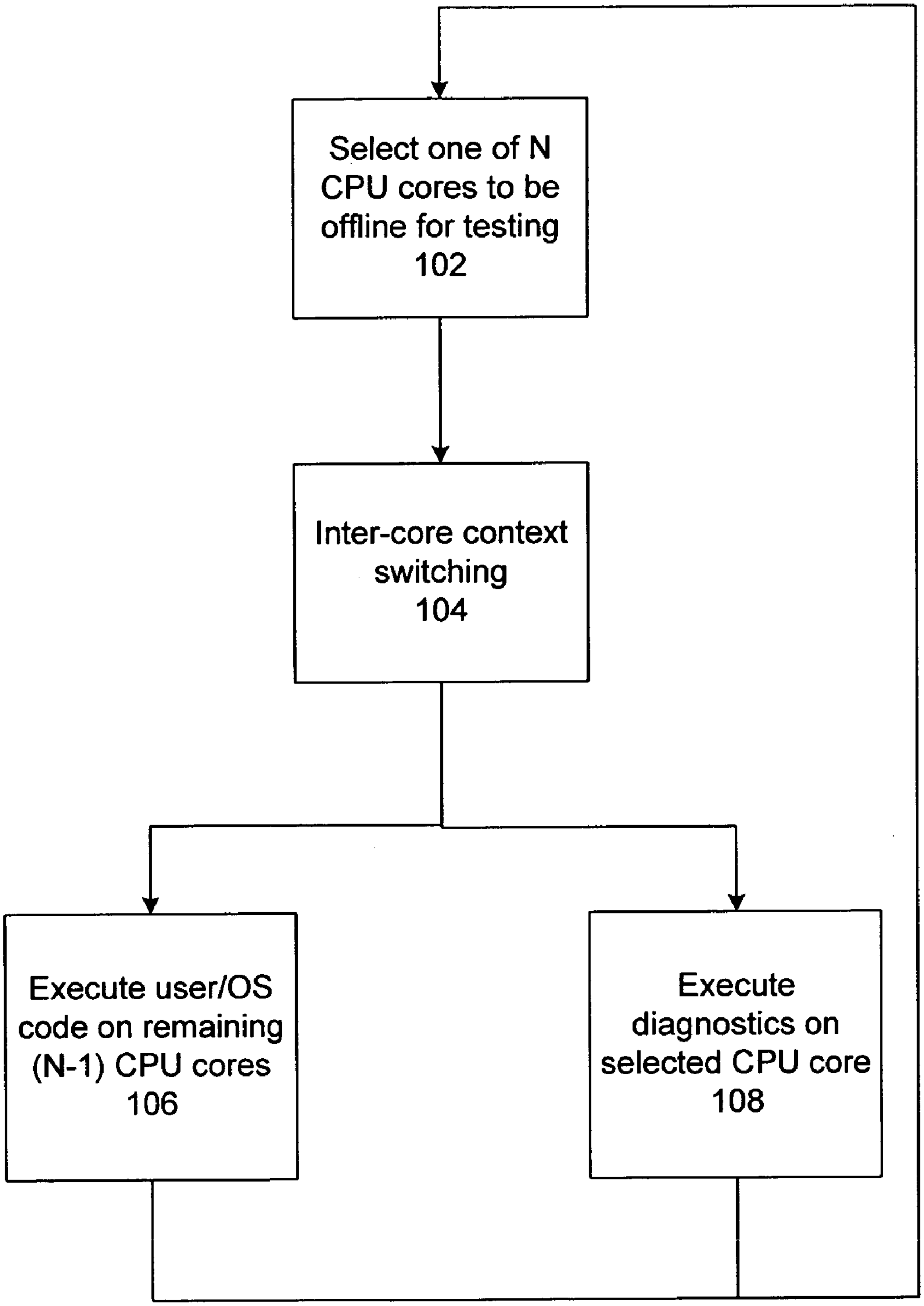
FIG. 4 is a flow chart depicting a method for fault-tolerant multi-core microprocessing in accordance with an embodiment of the invention.

FIG. 4 is a flow chart depicting a method for fault-tolerant multi-core microprocessing in accordance with an embodiment of the invention. The process 100 of FIG. 4 may be utilized in a multi-core microprocessor with N CPU cores, where N is two or more.

Per the embodiment depicted in FIG. 4, one of the N CPU cores is selected 102 to be "offline" for testing purposes. In other words, the selected CPU core will be made unavailable to execute user and/or operating system (OS) code, but rather it will be reserved to execute diagnostics operations thereon. In accordance with one embodiment, the selection 102 may be performed by an algorithm that assures full coverage of the N CPU cores. For example, the algorithm may use a round-robin type method to select 102 the core to be tested.

Prior to executing code on the N−1 cores and diagnostics on the selected core, inter-core context switching 104 may need to be performed. Such context switching would typically involve switching a recently-tested CPU core back to the pool of cores available to execute code and also switching the selected core out of the pool so that diagnostics may be performed thereon. In accordance with one embodiment of the invention, special dedicated communication links may be provided on the microprocessor die. The dedicated communication links may be configured to take advantage of the close proximity of the CPU cores as they are located on the same die. Using such closely configured links, the context switch between a recently-tested core and a running core may be completed with only a relatively minor performance hit. This is because data does not need to move off chip which would slow down the context switching due to a substantially slower system-level communication link.

Subsequently, user and/or OS code is executed 106 on the remaining (N−1) CPU cores and in parallel diagnostics is executed 108 on the selected CPU core. While in the preferred embodiment only one of the CPU cores executes diagnostics at a time, an alternate embodiment may execute diagnostics on more than one core at a time. However, the alternate embodiment would typically have a higher performance overhead.

Each diagnostic operation may be selected from a predetermined test pattern. Such a test pattern should include diagnostic operations and associated known results. Preferably, the test pattern is chosen so as to provide an effective trial as to the proper functioning of various components of the functional unit being tested. The specifics of an effective test pattern depends on specifics of the execution unit being tested. In accordance with an embodiment of the invention, the testing coverage is configurable.

After the health check on the selected CPU core is finished, the verified healthy CPU core may be put back into the pool of usable CPU cores and a different CPU may be selected 102 to be health checked. Note that the system does not have to be taken off line to perform this fault checking. Through the use of an algorithm, such as round robin, each of the CPU cores may be fault checked and then put back to work running user/OS code.

In one embodiment, the control of the rotation of CPU cores may be performed at the operating system level. In another embodiment, the control of the rotation of CPU cores may be performed at the hardware level by dedicated circuitry on the microprocessor.

In accordance with an embodiment of the invention, the microprocessor 'virtualizes' the CPUs so that the operating system does not know (or care) which actual physical CPUs it is being run on at any moment in time. For example, if there are eight CPU cores in the microprocessor chip, then the cores may be physically numbered '0' through '7' for purposes internal to the microprocessor hardware. However, for purposes external to the microprocessor hardware, the cores may be assigned to different virtual numbers or addresses. These virtual or external numbers may be seen and used by the operating system. Providing and using such virtual or external numbering for the cores advantageously makes it much easier for the operating system to deal with the switching of CPU cores between use and testing. Using such virtual numbering, then, from the perspective of the operating system, the CPU core may look the same in all aspects.

Hence, in accordance with an embodiment of the invention, the microprocessor chip may include programmable hardware circuitry and/or software code to swap external CPU numbers between the CPU core that is being removed from service to be tested and the CPU core that is being put back into service in its place. By such swapping of external CPU numbers, the operating system doesn't even need to know that the CPU core in use has changed. Consider the example where there are eight CPU cores on a microprocessor chip. Consider further that the chip presents only six of the cores for use to the operating system and that two cores are spares. In this example, the six may be externally numbered '0' through '5', and the two spares may be externally numbered '6' and '7'. For instance, when it is time to test the CPU core currently numbered '1', then CPU '6' may be given '1' as its new number, and '1' may be given '6' as its new number as part of the 'context switch'. A faulty (black-listed) CPU will be permanently given an external CPU number such that it will never be used by the system or microprocessor chip.

Figure 5A:
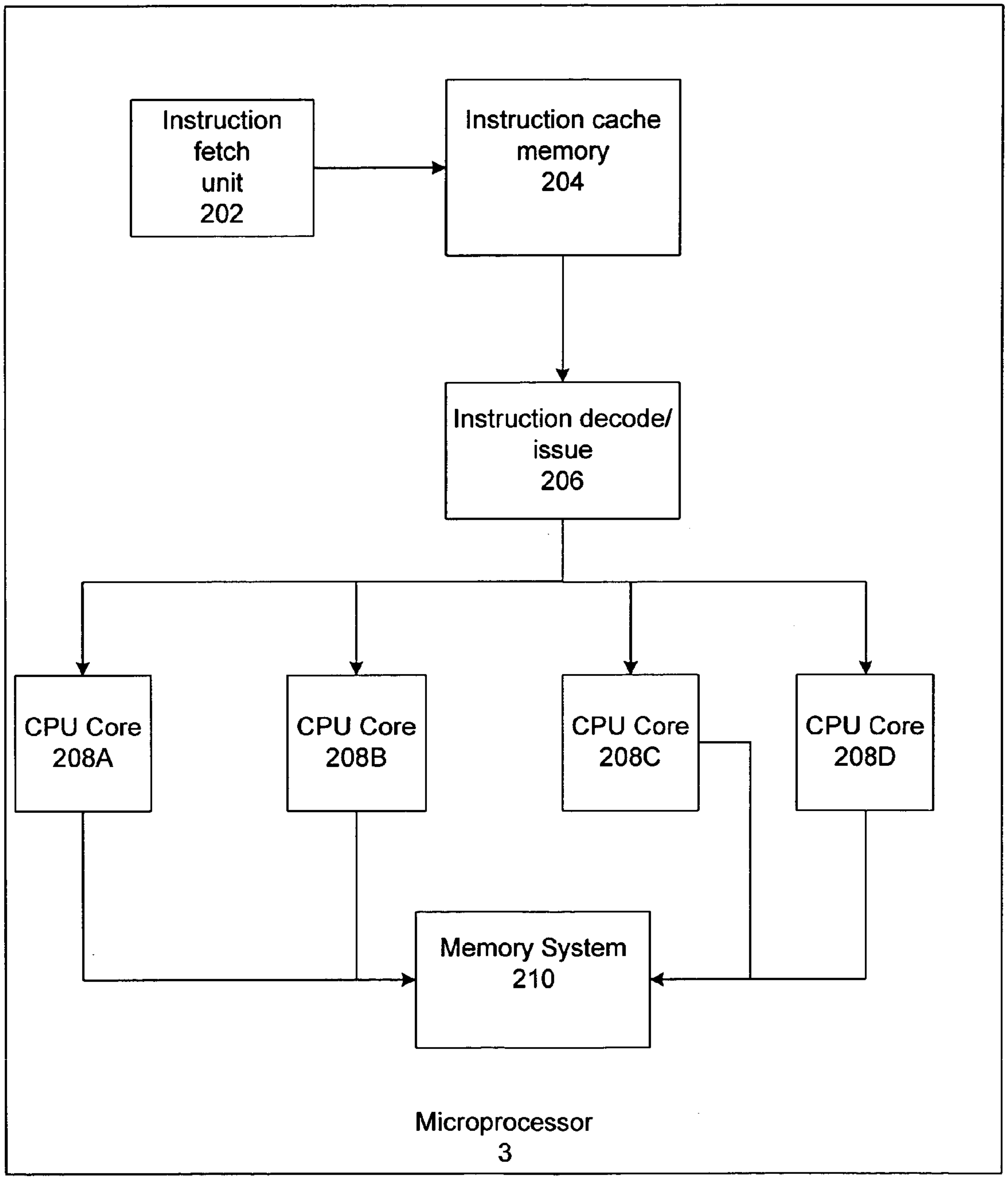
FIG. 5A is a schematic diagram depicting select components of a microprocessor with multiple CPU cores in one example.

FIG. 5A is a schematic diagram depicting select components of a microprocessor 3 with multiple CPU cores 208 in one example. An actual multi-core microprocessor 3 will, of course, have numerous other components that are not illustrated.

The components illustrated for explanatory purposes include an instruction fetch unit 202, an instruction cache memory 204, instruction decode/issue circuitry 206, multiple CPU cores 208, and a memory system 210. While the configuration illustrated has four CPU cores, embodiments of the invention may also be implemented on microprocessors with various numbers of cores, for example, six, eight, or more cores.

Addresses of instructions may be generated by circuitry in the instruction fetch unit 202. For example, the fetch unit 202 may be configured to include a program counter that increments from a starting address within the instruction cache 204 serially through successive addresses in order to serially read out successive instructions stored at those addresses. The instruction cache 204 stores instructions that are frequently being executed. Similarly, a data cache (not illustrated) may store data that is frequently being accessed to execute the instructions. In some implementations, the instruction and data caches may be combined into one memory unit.

The instruction decode/issue circuitry 206 receives instructions from the cache 204, and decodes and/or issues them to the multiple CPU cores 208 for execution. For example, four separate instructions may be decoded and issued, one to each of four CPUs 208A through 208D, for execution. The CPUs 208 may be configured to interface with a common memory system 210. The memory system 210 may include a memory system bus and may include both on-chip and off-chip memory components. Other circuitry, such as that to supply operands for the instruction execution, is not illustrated.

Figure 5B:
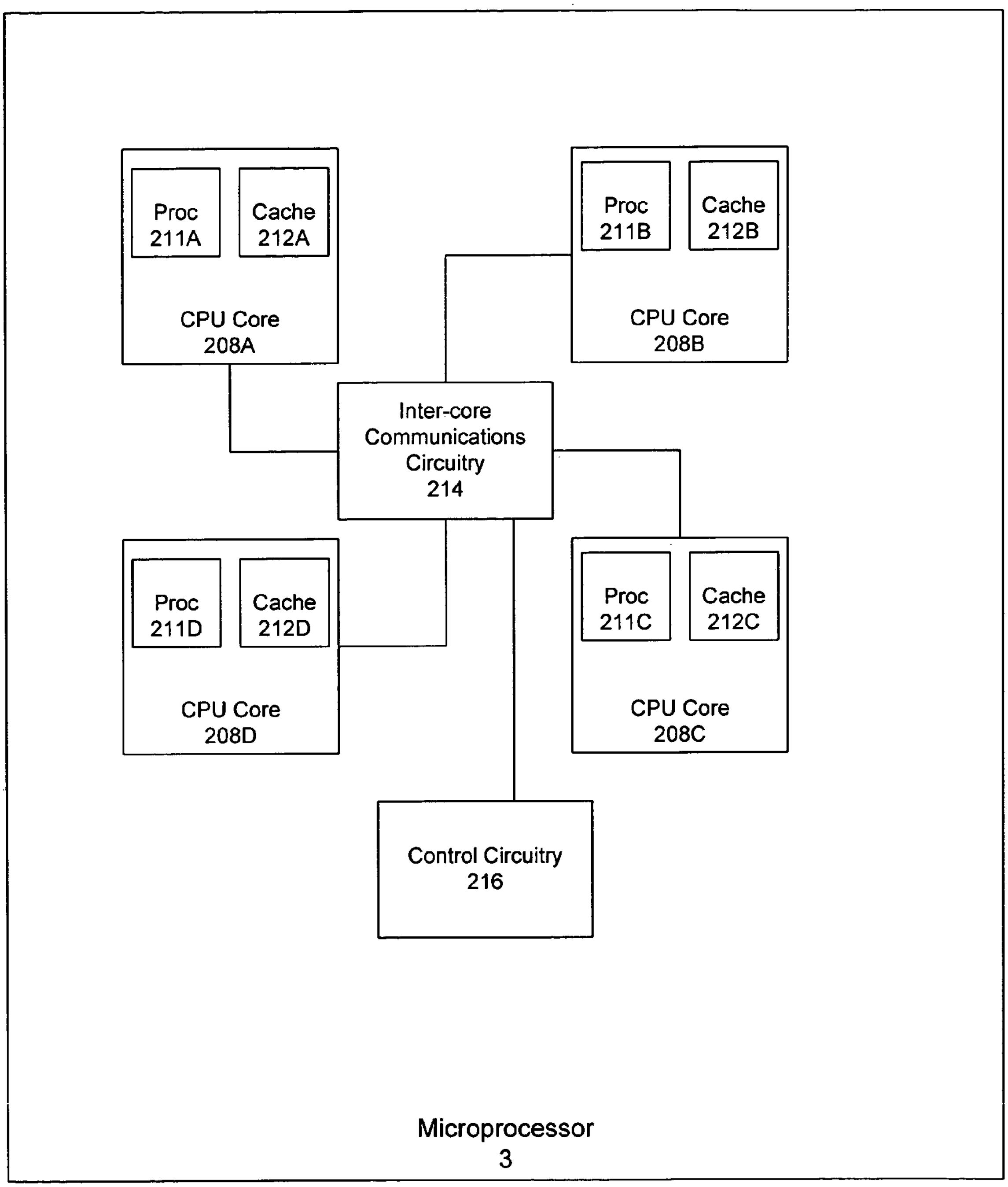
FIG. 5B is a schematic diagram depicting inter-core communications circuitry on a microprocessor in accordance with an embodiment of the invention.

FIG. 5B is a schematic diagram depicting inter-core communications circuitry on a multi-core microprocessor 3 in accordance with an embodiment of the invention. As depicted, each CPU core 208 may be configured to include a processor core 211 and associated local cache memory 212. When a context switch 104 is required as described above in relation to FIG. 5A, inter-core communications circuitry 214 may be utilized to perform the inter-core data transfer necessary for the context switch. The inter-core communications circuitry 214 may be located in the proximity of and in-between the various CPU cores 208 to facilitate rapid context switching. In accordance with one embodiment, the inter-core communications circuitry 214 may comprise crossbar switching circuitry and associated control circuitry. Control circuitry 216 coupled to the inter-core communications circuitry 214 may be used to in the selection of the CPU core 208 to be tested and to control the inter-core communications circuitry 214.

Note that the circuit components illustrated in FIGS. 5A and 5B are not necessarily to scale. In addition, the various components are presented in locations for purposes of explanation, but these locations are not necessarily reflective of specific layout positions on the microprocessor die.

Figure 6:
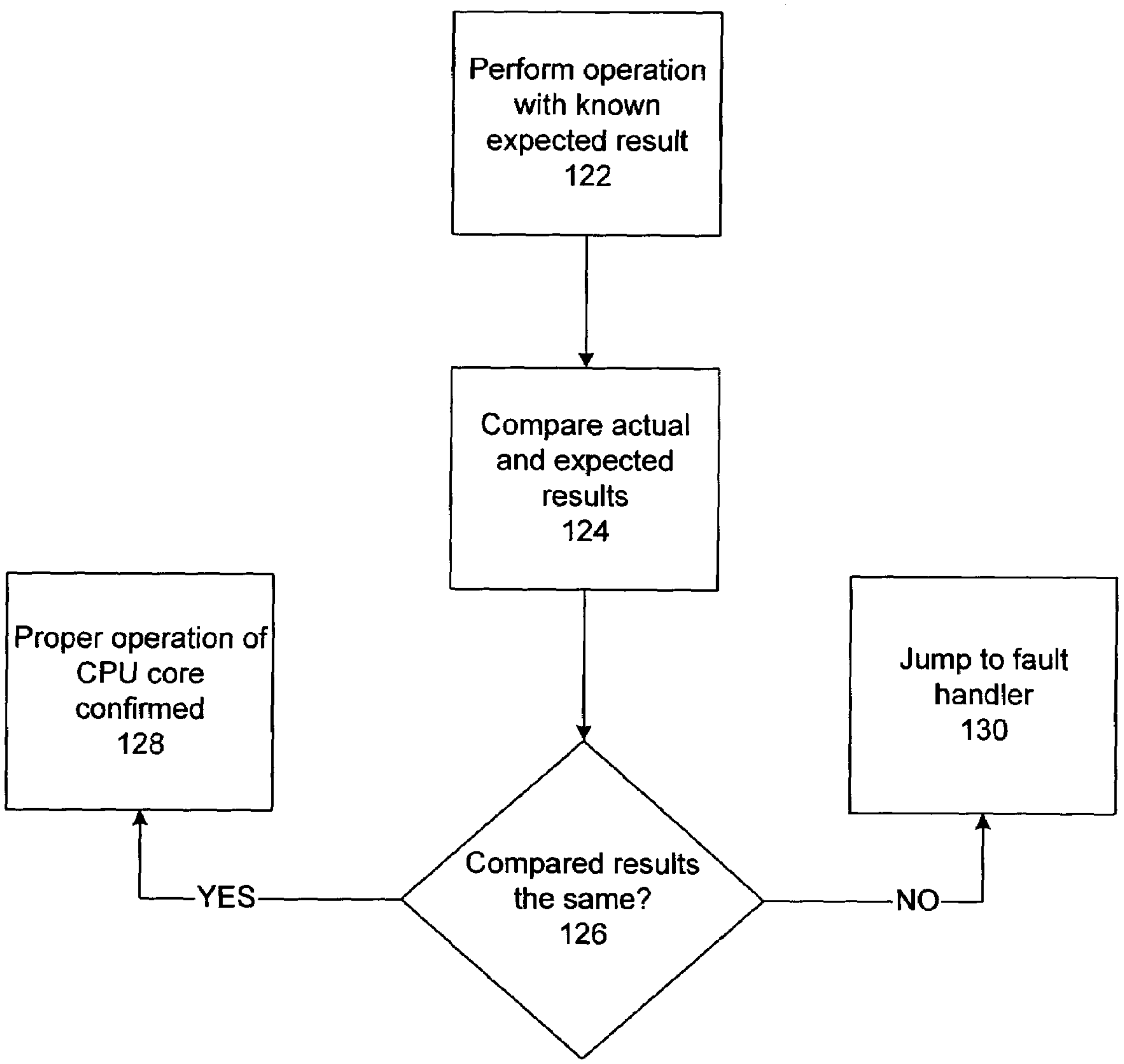
FIG. 6 is a flow chart depicting a diagnostic process to verify proper operation of a CPU core in accordance with an embodiment of the invention.

FIG. 6 is a flow chart depicting a diagnostic process to verify proper operation of a CPU core in accordance with an embodiment of the invention. Note that the process 120 depicted in FIG. 6 is an example process for explanatory purposes.

The diagnostic operation is performed 122 on the selected CPU core 208. It is performed with predetermined knowledge as to the expected result. The actual and expected results are then compared 124 and a determination 126 is made as to whether the compared results are the same. If the results are the same, then no error is indicated, and the proper operation of the selected CPU core is confirmed 128, and so that CPU core is kept in the pool of health-checked cores that are available to execute code. If the results are not the same, then a fault in the CPU core is indicated, and a jump 130 to a fault handler may occur. The fault handler may be configured to take appropriate action.

In accordance with one embodiment, the CPU core failing the diagnostic test may be "black-listed" and removed from use in executing code. In other words, the CPU core may be marked as no-use (not to be used). Such no-use functionality may be implemented by way of specific hardware circuitry. Marking one unit as no-use reduces the number of usable CPU cores by one to N–1. Subsequently, diagnostics may be continued to be performed on the CPU cores. In that case, only N–2 cores would be online while one unit would be reserved for diagnostic testing. And so on.

In accordance with another embodiment, the failure of one of the CPU cores may result in a halt of the system. Such a system halt, may be utilized before user data can be affected so as to prevent potential data corruption.

Figure 7:
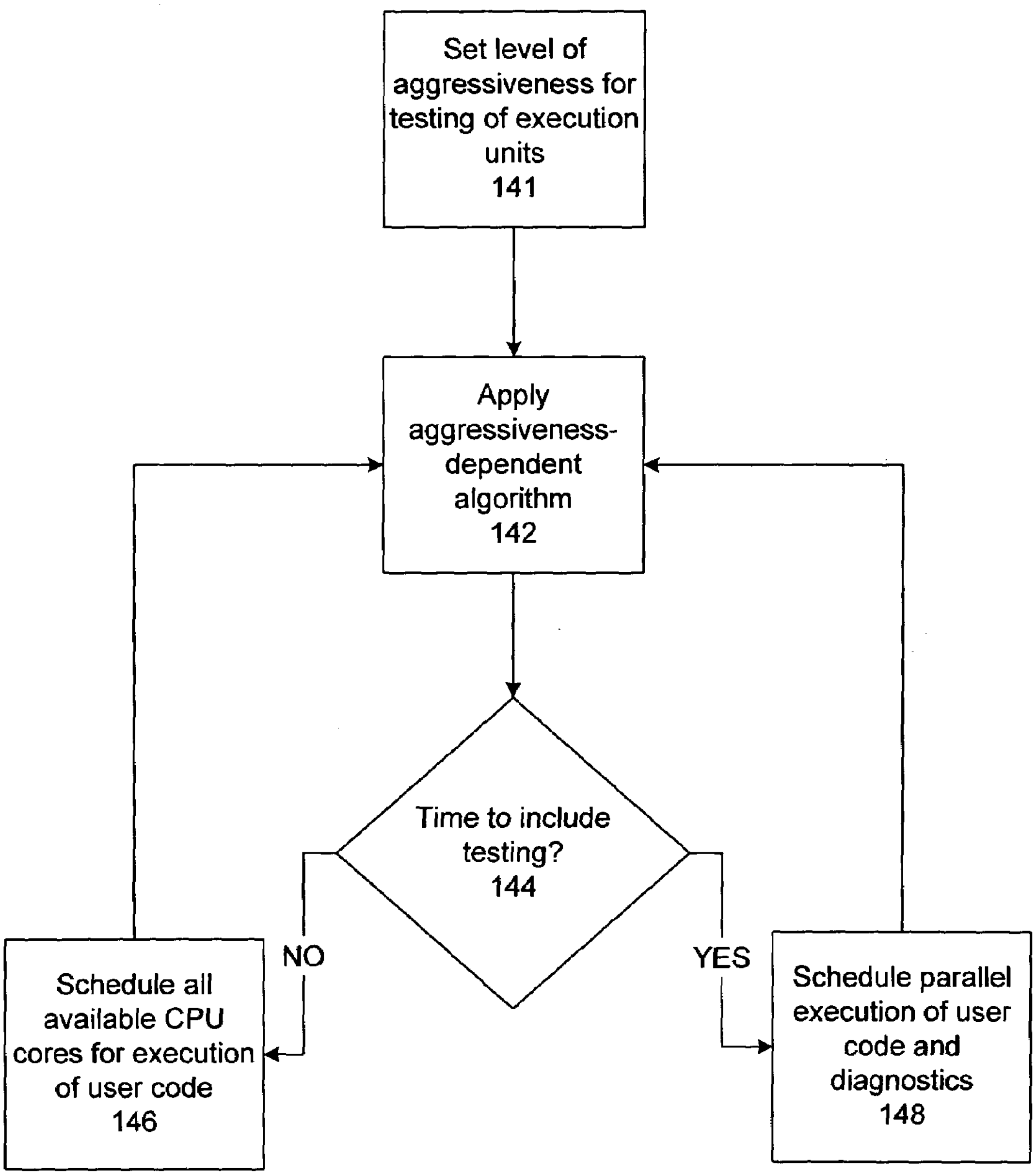
FIG. 7 is a flow chart depicting a method of scheduling fault-tolerant multi-core microprocessing with a variable aggressiveness level in accordance with one embodiment of the invention.

FIG. 7 is a flow chart depicting a method 140 of scheduling fault-tolerant multi-core microprocessing with a variable aggressiveness level in accordance with one embodiment of the invention. The method 140 of FIG. 7 may be optionally utilized to achieve a trade-off between performance and fault-tolerance. The method 140 may be performed in conjunction with a compiler such as one discussed above in relation to FIGS. 3*a* and 3*b*. Other embodiments of the invention may not utilize such a scheduling method 140.

Per the method 140 of FIG. 7, a preliminary step may involve setting 141 a variable level of aggressiveness for the testing of the execution units. In one embodiment, the variable level of aggressiveness may be implemented using one or more variable compiler flag(s). For example, a variable flag may specify a frequency of the testing. As another example, a variable flag may specify a maximum amount of performance overhead to be taken up by such testing. By setting the level of aggressiveness, a conscious tradeoff can be made between system performance and fault tolerance.

In one embodiment, an algorithm is used by the compiler to apply 142 the level of aggressiveness. The algorithm determines 144 when it is an appropriate time to schedule testing of a CPU core alongside the execution of the user/OS code. The higher the level of aggressiveness, the more often testing will be included. The lower the level of aggressiveness, the less often testing will be included. In a lowest level, the testing may be turned "off".

If the algorithm determines that it is not time to include the testing, the compiler will schedule 146 all available CPU cores to be used for the execution of the user and/or operating system code. If the algorithm determines that it is time to include the testing, the compiler will schedule 108 parallel execution of the code and of diagnostic testing. Such parallel execution is discussed in further detail above in relation to FIG. 4.

Because it is normally cost prohibitive to do full burn-in (past the left side of the well known "bathtub curve") on every microprocessor, a certain latent defect rate for microprocessors is usually considered as "acceptable". Advantageously, an embodiment of the invention exploits the fact that latent defects or weak latches in CPU cores tend to be predictable in advance in that they tend to "weaken" over time. In accordance with an embodiment of the invention, such defects may be found at run time and before they cause data corruption or cause a machine check and system failure.

Hence, an embodiment of the invention achieves a level of fault tolerance for a multi-core microprocessor, while minimizing the performance overhead and requiring only a limited amount of extra hardware. Advantageously, the health of CPU cores is checked during runtime so that potential errors can be detected before user data is corrupted. The microprocessor does not have to be taken off line to have such fault checking performed on the CPU cores therein. In one embodiment, high-speed dedicated links between cores are utilized to provide for faster context switching so as to minimize performance impact.

An embodiment of the present invention advantageously makes fault tolerant features available on lower-end systems. These fault-tolerant features are provided without requiring fully redundant processors running in lock-step and thus saving expensive hardware costs. Previously, such fault tolerant features may have been unavailable on such lower-end systems due to their cost-sensitive nature.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of executing program code on a target microprocessor with multiple CPU cores thereon, the method comprising:

selecting one of the CPU cores for testing;

performing inter-core context switching;

executing in parallel diagnostic code on the selected CPU core and the program code on remaining CPU cores, wherein the inter-core context switching includes swapping virtual CPU numbers between the CPU core selected for diagnostics and a recently-tested CPU core being put back to use.

2. The method of claim 1, wherein the selection of the CPU core for testing utilizes an algorithm that assures testing of each of the multiple CPU cores.

3. The method of claim 2, wherein the algorithm comprises a round-robin type algorithm.

4. The method of claim 1, further comprising:

setting a level of aggressiveness for scheduling the testing of the execution units.

5. The method of claim 4, further comprising:

applying an aggressiveness-dependent algorithm to determine when to schedule all available cores for execution of the program code and when to schedule parallel execution of the program code and the diagnostic code.

6. The method of claim 1, wherein the multiple CPU cores comprise at least four CPU cores integrated onto the microprocessor integrated circuit.

7. The method of claim 1, wherein the multiple CPU cores comprise at least eight CPU cores integrated onto the microprocessor integrated circuit.

8. The method of claim 1, wherein the diagnostic code performs diagnostic operations from a test pattern comprising operations with known expected results.

9. The method of claim 8, wherein the diagnostic code compares an actual result with a known expected result.

10. The method of claim 9, wherein the diagnostic code jumps to a fault handler if the compared results are different.

11. The method of claim 10, wherein the fault handler includes code to remove a faulty CPU core from use in executing the program code.

12. The method of claim 10, wherein the fault handler includes code to perform a system halt to prevent data corruption.

13. A microprocessor comprising:

a plurality of CPU cores integrated on the microprocessor chip; and inter-core communications circuitry coupled to each of the CPU cores and configured to perform context switching between the CPU cores, control circuitry coupled to the inter-core communications circuitry and configured select a first CPU core currently in use for diagnostic testing, wherein the inter-core communications circuitry is utilized to perform context switching between the first CPU core and a second CPU core which is not currently in use, wherein the microprocessor is configured to swap extemal CPU numbers between the first and second CPU cores.

14. The microprocessor of claim 13, wherein each CPU core comprises a processor core and an associated local cache memory.

* * * * *

UNITED STATES PATENT AND TRADEMARK OFFICE

CERTIFICATE OF CORRECTION

PATENT NO. : 7,206,966 B2
APPLICATION NO. : 10/690727
DATED : April 17, 2007
INVENTOR(S) : Andrew Harvey Barr et al.

It is certified that error appears in the above-identified patent and that said Letters Patent is hereby corrected as shown below:

In column 8, line 42, in Claim 13, after "configured" insert -- to --.

In column 8, line 49, in Claim 13, delete "extemal" and insert -- external --, therefor.

Signed and Sealed this

Eighth Day of September, 2009

David J. Kappos
*Director of the United States Patent and Trademark Office*